US009531008B2

(12) United States Patent
Takeuchi et al.

(10) Patent No.: US 9,531,008 B2
(45) Date of Patent: Dec. 27, 2016

(54) POSITIVE ELECTRODE FOR A LITHIUM BATTERY AND LITHIUM BATTERY EMPLOYING THE SAME

(75) Inventors: Masataka Takeuchi, Kanagawa (JP); Chiaki Sotowa, Kanagawa (JP)

(73) Assignee: SHOWA DENKO K.K., Tokyo (JP)

( * ) Notice: Subject to any disclaimer, the term of this patent is extended or adjusted under 35 U.S.C. 154(b) by 2084 days.

(21) Appl. No.: 11/660,280

(22) PCT Filed: Aug. 12, 2005

(86) PCT No.: PCT/JP2005/015107
§ 371 (c)(1),
(2), (4) Date: Mar. 16, 2007

(87) PCT Pub. No.: WO2006/019148
PCT Pub. Date: Feb. 23, 2006

(65) Prior Publication Data
US 2007/0202410 A1 Aug. 30, 2007

Related U.S. Application Data

(60) Provisional application No. 60/602,646, filed on Aug. 19, 2004.

(30) Foreign Application Priority Data

Aug. 16, 2004 (JP) .................... 2004-236575

(51) Int. Cl.
*H01M 4/62* (2006.01)
*H01M 4/58* (2010.01)
*H01M 4/48* (2010.01)
*H01M 4/131* (2010.01)
*H01M 4/505* (2010.01)
*H01M 4/525* (2010.01)
*H01M 10/052* (2010.01)
*H01M 4/133* (2010.01)
*H01M 4/1391* (2010.01)
*H01M 4/1393* (2010.01)
*H01M 4/02* (2006.01)
*H01M 10/42* (2006.01)

(52) U.S. Cl.
CPC ............. *H01M 4/625* (2013.01); *H01M 4/131* (2013.01); *H01M 4/505* (2013.01); *H01M 4/525* (2013.01); *H01M 10/052* (2013.01); *H01M 4/133* (2013.01); *H01M 4/1391* (2013.01); *H01M 4/1393* (2013.01); *H01M 2004/021* (2013.01); *H01M 2010/4292* (2013.01); *Y02E 60/122* (2013.01)

(58) Field of Classification Search
USPC ........................................................ 429/232
See application file for complete search history.

(56) References Cited

U.S. PATENT DOCUMENTS

| 4,358,513 | A  | * | 11/1982 | Kaun ..................... H01M 4/13 252/182.1 |
| 4,575,533 | A  | * | 3/1986  | Horie et al. .................... 525/72 |
| 6,261,722 | B1 | * | 7/2001  | Dasgupta et al. ............ 429/304 |
| 6,287,719 | B1 | * | 9/2001  | Bailey ..................... H01M 6/10 429/159 |
| 2001/0034934 | A1 | * | 11/2001 | Xu et al. ...................... 29/623.1 |
| 2003/0082446 | A1 | * | 5/2003  | Chiang et al. ............... 429/209 |
| 2003/0099883 | A1 | * | 5/2003  | Ochoa et al. ................ 429/232 |
| 2003/0207174 | A1 | * | 11/2003 | Nanjundaswamy et al. . 429/219 |
| 2004/0053135 | A1 | * | 3/2004  | Matsumoto et al. ....... 429/231.3 |
| 2004/0101756 | A1 | * | 5/2004  | Koyama et al. ........... 429/231.8 |
| 2004/0111873 | A1 | * | 6/2004  | Okawa et al. ............... 29/623.1 |
| 2004/0126300 | A1 | * | 7/2004  | Barker et al. ................ 423/306 |
| 2004/0126655 | A1 | * | 7/2004  | Hisamitsu et al. .......... 429/162 |
| 2010/0261060 | A1 | * | 10/2010 | Choy et al. ................... 429/221 |

(Continued)

FOREIGN PATENT DOCUMENTS

EP   0 319 130 A2    6/1989
EP     1191131    *  3/2002  ............ D01F 9/127
(Continued)

OTHER PUBLICATIONS

Frysz et al., "Carbon filaments as a conductive additive to the manganese dioxide cathode of a lithium electrolytic cell;" Journal of Power Sources; vol. 58; 1996; pp. 41-54.*

(Continued)

*Primary Examiner* — Ula C Ruddock
*Assistant Examiner* — Amanda Barrow
(74) *Attorney, Agent, or Firm* — Sughrue Mion, PLLC

(57) ABSTRACT

The present invention relates to a lithium battery positive electrode comprising an active substance that can occlude and release lithium ion, a carbon-based conductivity enhancer, and a binder, characterized in that the positive electrode contains the carbon-based conductivity enhancer in an amount of 0.1 to 2 mass % on the basis of the entire mass of the positive electrode, and that the carbon-based conductivity enhancer contains a carbon fiber having a mean fiber diameter of 1 to 200 nm, wherein the active substance that can occlude and release lithium ion is contained in an amount, as calculated from the true density of the active substance, of 70% by volume or more on the basis of the total volume of the positive electrode; and relates to a lithium battery using the a lithium battery positive electrode.

The positive electrode obtained by the present invention has an excellent electrolyte permeability and electrolyte retention. Therefore, it is better adapted to high-density lithium battery.

21 Claims, No Drawings

(56) References Cited

U.S. PATENT DOCUMENTS

2011/0068298 A1* 3/2011 Wixom et al. ............. 252/182.1

FOREIGN PATENT DOCUMENTS

| JP | 11-176446 A | 7/1999 | |
|---|---|---|---|
| JP | 11-312523 * | 11/1999 | ............. H01M 4/62 |
| JP | 11-312523 A | 11/1999 | |
| JP | 2000-208147 A | 7/2000 | |
| JP | 2002-358951 * | 12/2002 | ............. H01M 4/02 |
| JP | 2002-358951 A | 12/2002 | |
| JP | 2003-20527 A | 1/2003 | |
| JP | 2003-187795 A | 7/2003 | |
| JP | 2003-331838 A | 11/2003 | |
| JP | 2004-31164 | 1/2004 | |
| JP | 2004-95426 A | 3/2004 | |
| JP | 2004-186075 * | 7/2004 | ............. H01M 4/62 |
| JP | 2004-186075 A | 7/2004 | |
| JP | 2004-220909 A | 8/2004 | |
| JP | 2004-273433 | 9/2004 | |

OTHER PUBLICATIONS

Borong Wu, Yonghuan Ren and Ning Li (2011). LiFePO4 Cathode Material, Electric Vehicles—The Benefits and Barriers, Dr. Seref Soylu (Ed.), ISBN: 978-953-307-287-6, InTech, Available from: http://www.intechopen.com/books/electric-vehicles-the-benefits-and-barriers/lifepo4-cathode-material, accessed Sep. 16, 2015.*

* cited by examiner

POSITIVE ELECTRODE FOR A LITHIUM BATTERY AND LITHIUM BATTERY EMPLOYING THE SAME

CROSS-REFERENCE TO RELATED APPLICATIONS

This is an application filed pursuant to 35 U.S.C. Section 111(a) with claiming the benefit of U.S. provisional application Ser. No. 60/602,646 filed Aug. 19, 2004 under the provision of 35 U.S.C. 111(b), pursuant to 35 U.S.C. Section 119(e) (1).

TECHNICAL FIELD

The present invention relates to a positive electrode for a lithium battery having high electrode density and high charge/discharge capacity per volume and exhibiting excellent charge/discharge cycle characteristics, large-current load characteristics, and electrolyte permeability, and to a lithium battery employing the positive electrode. More particularly, the invention relates to a high-density positive electrode for use in a lithium secondary battery, and to a lithium secondary battery employing the positive electrode. Still more particularly, the invention relates to a positive electrode for a lithium battery, which electrode contains a specific carbon fiber serving as a conductivity enhancer that exerts its effect through addition thereof in as small an amount as possible, in order to produce a positive electrode for a high-energy-density lithium battery, particularly such a battery that attains a satisfactory energy density per volume, which is a key property for small-sized portable electronic apparatuses.

BACKGROUND ART

In a trend toward reduction of size and weight of portable electronic apparatuses of higher performance, keen demand has arisen for secondary batteries having high energy density and high capacity. Under such circumstances, lithium secondary batteries (e.g., lithium ion batteries and lithium polymer batteries) employing a non-aqueous electrolyte find a variety of uses, such as secondary batteries for use in a small portable electronic apparatus such as a mobile phone or a video camera, by virtue of high-energy-density, high-voltage characteristics. In such a lithium secondary battery, a positive electrode is formed of a metal oxide compound material (e.g., lithium cobaltate) that attains large charge/discharge capacity per unit mass at high voltage, while a negative electrode is formed of a carbon material (e.g., graphite) that exhibits a base voltage nearly equal to that of lithium and large charge/discharge capacity per unit mass. The charge/discharge capacity (per mass) values of these electrodes have been already improved to levels nearly equal to theoretical values, and further improvement in energy density per mass of a battery employing the electrodes is virtually limited. Therefore, extensive efforts have been made to develop novel high-capacity positive electrode materials such as iron olivine compounds and metal sulfides, as well as novel high-capacity negative electrode materials such as a composite material of carbon material with tin oxide, silicon oxide, lithium alloy, or lithium nitride.

Secondary batteries for use in small portable electronic apparatuses are required to be miniaturized. That is, energy density per mass and energy density per volume must be increased. For this purpose, one studied approach includes increasing electrode density so as to elevate the amount of material charged in a battery casing, thereby elevating energy density per volume of an electrode or a battery.

For example, lithium cobaltate-based oxide, a typical positive electrode material, has a true density of about 5.1 g/cm$^3$, and an existing electrode employing lithium cobaltate has an electrode density less than 3.3 g/cm$^3$. Thus, studies have been carried out for enhancing the electrode density to 3.5 g/cm$^3$ or higher.

However, when the electrode density is elevated, interspaces in the electrode decrease. In this case, the amount of an electrolyte, which is generally present in the interspaces and plays an important role in electrode reaction, decreases, and permeation of the electrolyte into the electrode requires a longer time. Both cases are problematic. Shortage of electrolyte in the electrode induces retardation of electrode reaction, thereby problematically lowering energy density or high-speed charge/discharge performance. In addition, retardation of permeation of electrolyte results in a longer time for battery production, thereby increasing production cost. When a highly viscous polymer electrolyte is used (e.g., in a lithium polymer battery), production time is detrimentally prolonged.

In order to solve the aforementioned problems, an attempt has been made to reduce the amount of the carbon-based conductivity enhancer added to the positive electrode to as small a level as possible, to thereby increase the mass of active substance in the positive electrode and increase energy density. Furthermore, by reducing the amount of bulky carbon-based conductivity enhancer, electrode density per se can be elevated. However, when the conductivity enhancer is reduced excessively, conductivity of the electrode decreases and charge/discharge processes are disturbed, since a metal oxide compound such as lithium cobaltate-based oxide generally exhibits semi-conductivity. Therefore, conventionally, a carbon-based conductivity enhancer such as carbon black has been used in an amount of about 3 mass % or more.

DISCLOSURE OF THE INVENTION

In realization of a high-density electrode required for producing a high-energy-density battery, an object of the present invention is to improve unsatisfactory electrolyte permeability and electrolyte retention.

In view of the aforementioned problems involved in lithium battery electrodes, the present inventors have carried out extensive studies, and have found that a high-performance lithium battery which exhibits high energy density and high-speed charge/discharge performance can be produced without impairing conductivity or electrolyte permeability, through use of a positive electrode for a lithium battery (hereinafter referred to as a lithium battery positive electrode) comprising a positive electrode active substance, a carbon-based conductivity enhancer containing a specific carbon fiber, and a binder, which electrode contains the carbon-based conductivity enhancer in an amount of 0.1 to 2 mass % on the basis of the entire mass of the positive electrode (note that the positive electrode is formed of a positive electrode active substance, a carbon-based conductivity enhancer, and a binder and does not include a collector). The present invention has been accomplished on the basis of this finding.

Heretofore, studies have been performed for enhancing a cycle life of a battery through addition of carbon fiber to a lithium-containing positive electrode material. For example, Japanese Patent No. 2695180 (EP No. 319130) discloses that a lithium secondary battery exhibiting improved charge/ discharge cycle is obtained through addition of carbon fiber to an oxide positive electrode. Japanese Patent Application Laid-Open (kokai) No. 2000-208147 discloses a positive electrode containing carbon powder (e.g., carbon black), carbon flakes (e.g., graphite), or fibrous carbon. In the above conventional techniques, carbon fiber is added for the purpose of lowering electrode resistance and increasing strength of electrodes, and these documents do not suggest the concept of addition of carbon fiber in order to increase the density of the electrodes. In these techniques, carbon fiber is generally added in an amount of about 5 to 10 mass %.

The present invention has been established on the basis of the finding that a high-density (e.g., porosity of 20% or less) electrode can be produced through addition of a specific carbon fiber in a specific amount, without considerably impairing electrolyte permeability, whereby the produced electrode exhibits such low electrode resistance and excellent electrode strength as conventionally obtained.

One possible reason why the electrolyte permeability of the high-density electrode is enhanced through addition of carbon fiber is that the carbon fiber filaments are appropriately dispersed in a compact of highly pressed particles of an active substance material, thereby maintaining interspaces between particles of an active substance.

The present invention provides the following lithium battery positive electrode and lithium battery employing the positive electrode.

[1] A lithium battery positive electrode comprising an active substance that can occlude and release lithium ion, a carbon-based conductivity enhancer, and a binder, characterized in that the positive electrode contains the carbon-based conductivity enhancer in an amount of 0.1 to 2 mass % on the basis of the entire mass of the positive electrode, and that the carbon-based conductivity enhancer contains a carbon fiber having a mean fiber diameter of 1 to 200 nm.

[2] The lithium battery positive electrode as described in [1] above, which contains the active substance that can occlude and release lithium ion in an amount, as calculated from the true density of the active substance, of 70% by volume or more on the basis of the total volume of the positive electrode.

[3] The lithium battery positive electrode as described in [1] or [2] above, wherein the active substance is a metal oxide compound that can occlude and release lithium ion.

[4] The lithium battery positive electrode as described in [1] above, wherein the carbon fiber is a graphite carbon fiber which has undergone heat treatment at 2,000° C. or higher.

[5] The lithium battery positive electrode as described in [1] or [4] above, wherein the carbon fiber has a total metal impurity content of 30 ppm or less.

[6] The lithium battery positive electrode as described in [1], [4], or [5] above, wherein the carbon fiber is a graphite carbon fiber containing boron in an amount of 0.1 to 100,000 ppm.

[7] The lithium battery positive electrode as described in any of [1] and [4] to [6] above, wherein the carbon fiber has a mean aspect ratio of 50 to 15,000.

[8] The lithium battery positive electrode as described in [7] above, wherein the carbon fiber has a mean fiber diameter of 10 to 200 nm.

[9] The lithium battery positive electrode as described in any of [1] and [4] to [8] above, wherein the carbon fiber has a hollow inner structure.

[10] The lithium battery positive electrode as described in any of [1] and [4] to [9] above, wherein the carbon fiber contains a branched carbon fiber.

[11] The lithium battery positive electrode as described in [3] above, wherein the metal oxide compound serving as the active substance that can occlude and release lithium ion has a mean primary particle size of 0.5 to 30 μm.

[12] The lithium battery positive electrode as described in [3] or [11] above, wherein the metal oxide compound serving as the active substance that can occlude and release lithium ion contains a cobalt-containing oxide in an amount of 60 mass % or more and the positive electrode has an electrode density of 3.7 g/cm$^3$ or more.

[13] The lithium battery positive electrode as described in [3] or [11] above, wherein the metal oxide compound serving as the active substance that can occlude and release lithium ion contains a manganese-containing oxide in an amount of 60 mass % or more and the positive electrode has an electrode density of 3.2 g/cm$^3$ or more.

[14] The lithium battery positive electrode as described in [3] or [11] above, wherein the metal oxide compound serving as the active substance that can occlude and release lithium ion contains a mixture of a cobalt-containing oxide and a manganese-containing oxide, in an amount of 80 mass % or more and the positive electrode has an electrode density of 3.5 g/cm$^3$ or more.

[15] The lithium battery positive electrode as described in [3] or [11] above, wherein the metal oxide compound serving as the active substance that can occlude and release lithium ion contains a nickel-containing oxide in an amount of 60 mass % or more and the positive electrode has an electrode density of 3.5 g/cm$^3$ or more.

[16] The lithium battery positive electrode as described in [3] or [11] above, wherein the metal oxide compound serving as the active substance that can occlude and release lithium ion contains a mixture of a cobalt nickel complex oxide in an amount of 60 mass % or more and the positive electrode has an electrode density of 3.6 g/cm$^3$ or more.

[17] The lithium battery positive electrode as described in [3] or [11] above, wherein the metal oxide compound serving as the active substance that can occlude and release lithium ion contains a mixture of a cobalt manganese complex oxide in an amount of 60 mass % or more and the positive electrode has an electrode density of 3.6 g/cm$^3$ or more.

[18] The lithium battery positive electrode as described in [3] or [11] above, wherein the metal oxide compound serving as the active substance that can occlude and release lithium ion contains a mixture of a cobalt nickel manganese complex oxide in an amount of 60 mass % or more and the positive electrode has an electrode density of 3.6 g/cm$^3$ or more.

[19] The lithium battery positive electrode as described in [3] or [11] above, wherein the metal oxide compound serving as the active substance that can occlude and release lithium ion contains a mixture of an iron olivine compound in an amount of 60 mass % or more and the positive electrode has an electrode density of 2.9 g/cm$^3$ or more.

[20] A lithium battery comprising, as a constitutional element, a lithium battery positive electrode as recited in any of [1] to [19] above.

[21] A lithium secondary battery comprising, as a constitutional element, a lithium battery positive electrode as recited in any of [1] to [19] above.

[22] The lithium secondary battery as described in [21] above, wherein the battery employs a non-aqueous electrolyte and/or a non-aqueous polymer electrolyte, and the non-aqueous electrolyte and/or the non-aqueous polymer electrolyte employ(s) a non-aqueous solvent containing at least one species selected from the group consisting of ethylene carbonate, diethyl carbonate, dimethyl carbonate, methyl ethyl carbonate, propylene carbonate, butylene carbonate, and vinylene carbonate.

DETAILED DESCRIPTION OF THE INVENTION

1. Carbon Fiber

Generally, lithium battery positive electrodes are produced from a positive electrode active substance material powder having a particle size of some to some tens of μm through pressure molding at high pressure by use of rollers or a similar apparatus. Thus, interspaces between particles of the powder is reduced, thereby considerably decreasing electrolyte permeability. When a thin fiber having high toughness against deformation by pressure is incorporated into a positive electrode, interspaces are provided between particles of the electrode active substance powder, whereby permeation of electrolyte is facilitated. Such interspaces provided between particles of the electrode active substance would impair conductivity of the electrode active substance, thereby reducing electrode performance. Thus, preferably, the incorporated fiber per se has excellent conductivity, and has as long a fiber length as possible in order to increase conduction paths. From the viewpoint of electrode performance, a carbon fiber having satisfactory conductivity, toughness, and small fiber diameter must be incorporated into the electrode.

(1-1) Fiber Diameter of Carbon Fiber

The carbon fiber incorporated into the lithium battery positive electrode has a fiber diameter falling within a range of 1 to 200 nm, preferably 5 to 180 nm, more preferably 10 to 150 nm. When the carbon fiber incorporated into the lithium battery positive electrode of the present invention has a fiber diameter in excess of 200 nm, interspaces in the electrode increase excessively, thereby failing to elevate electrode density, in consideration that generally employed active substances have a mean particle size of about some to some tens of μm. When the fiber diameter is excessively small (i.e., less than 1 nm), the carbon fiber remains between particles of the active substance, thereby failing to provide the target interspaces in the electrode. Needless to say, both cases are not preferred.

(1-2) Crystallization Degree of Carbon Fiber

The carbon fiber preferably has a high crystallization degree (graphitization degree). In general, as the graphitization degree of carbon material increases, the layer structure of the carbon material is more developed, resulting in higher hardness and conductivity. Such a carbon material is suitable for a positive electrode additive. Carbon material can be graphitized through high-temperature heat treatment. Although the treatment temperature varies depending on the type of carbon fibers, the temperature is preferably 2,000° C. or higher, more preferably 2,500° C. or higher. In the heat treatment, addition in advance of boron or Si, which serves as a graphitization co-catalyst for promoting graphitization, is effective for graphitization. No particular limitation is imposed on the amount of the co-catalyst, and the co-catalyst is preferably added in an amount of 10 ppm by mass to 50,000 ppm by mass. When the amount is excessively small, a satisfactory effect cannot be attained, whereas when the amount is excessive, the co-catalyst remains as an impurity after heat treatment. Both cases are not preferred.

No particular limitation is imposed on the crystallinity of the carbon fiber, which is represented by the plane distance $d_{002}$. The plane distance $d_{002}$ as determined through X-ray diffraction is preferably 0.344 nm or less, more preferably 0.339 nm or less, with Lc, the thickness of a crystallite as measured along the c-axis, being 40 nm or less.

(1-3) Fiber Length and Aspect Ratio of Carbon Fiber

No particular limitation is imposed on the length of the carbon fiber. As mentioned above, the carbon fiber preferably has as long a length as possible, from the viewpoint of enhancement of conductivity, strength of the electrode and electrolyte retention. Particularly in the present invention, the carbon fiber has as long a length as possible for effectively utilizing the carbon material incorporated in a small amount to the electrode, so long as dispersibility of the carbon fiber in the electrode is not impaired. Although the preferred rage of the mean fiber length varies depending on the type and fiber diameter of the carbon fiber employed, the mean fiber length is preferably 2 to 100 μm, more preferably 5 to 100 μm. When the preferred range of the mean fiber length is reduced to the mean aspect ratio (a ratio of length to diameter), the mean aspect ratio is preferably 20 to 50,000, more preferably 50 to 15,000.

The carbon fiber preferably contains branched fiber filaments, from the viewpoint of enhancement of conductivity of the entire electrode and strength of the electrode and electrolyte retention. However, if branched fiber filaments are included in excessive amounts, dispersibility of fiber filaments in the electrode is impaired, similar to the case in which fiber length is excessively long. Thus, branched fiber filaments are included in appropriate amounts. The amounts of branched fiber filaments can be controlled to a certain extent on the basis of the production method or pulverization performed after production.

(1-4) Method of Producing Carbon Fiber

No particular limitation is imposed on the method for producing the carbon fiber employed in the present invention. Examples of the production method include a method in which a polymer is formed into fiber through spinning or a similar technique, followed by heating the fiber in an inert atmosphere; and the vapor growth method including reaction of an organic compound at high temperature in the presence of a catalyst. In the carbon fiber obtained through the vapor growth method; i.e., vapor grown carbon fiber, the growth direction virtually coincides with the fiber axis. Therefore, the carbon fiber tends to assume a graphite structure having high crystallization degree in the length direction and, as a result, has a relatively small fiber diameter, high conductivity, and high strength.

In order to attain the object of the present invention, vapor grown carbon fiber, which has a growth direction coinciding with the fiber axis direction and includes branched filaments, is suitable. Vapor grown carbon fiber may be produced through, for example, a method including feeding an organic compound gas and iron serving as a catalyst into a high-temperature atmosphere. Any of as-produced vapor grown carbon fiber, a vapor grown carbon fiber which has been heated to about 800 to about 1,500° C., and a vapor grown carbon fiber which has been graphitized at about 2,000° C. to about 3,000° C. may be used in the present invention, and a carbon fiber suitable for the electrode active substance powder employed is selected from these carbon fiber species. Among them, heat-treated (more preferably graphitized) carbon fiber, having a high crystallization degree of carbon, is preferred, from the viewpoint of high conductivity and high withstand voltage characteristics.

In a preferred embodiment of the vapor grown carbon fiber, the vapor grown carbon fiber has a branched structure. The branches may have a hollow structure which communicates with any portion of the hollow fiber filament. In this case, tube-shaped carbon layers are linked together. The term "hollow structure" refers to a tubular structure of a carbon layer and includes an imperfect cylindrical structure, a cylinder having a partially discontinuous portion, and a carbon layer composed of two carbon layers laminated on each other. No particular limitation is imposed on the form of the cross-section of the cylinder, and the form may be a perfect circle, an oval, or a polygon.

The vapor grown carbon fiber has, on its surface, large amounts of irregularities and rough portions. Thus, the fiber advantageously exhibits enhanced adhesion to an electrode active substance. Particularly when the electrode active substance that is formed from carbonaceous powder particles is used to form a negative electrode of a secondary battery, the vapor grown carbon fiber exhibits enhanced adhesion to the carbonaceous material serving as nuclei. Thus, even when charge/discharge cycles are repeated, the carbonaceous material and the vapor grown carbon fiber, which also serves as an electrical conductivity enhancer, are firmly deposited together and are not dissociated from each other, whereby electronic conductivity can be maintained and cycle characteristics are improved.

When the vapor grown carbon fiber contains a large amount of branched portions, conductive networks can be formed in an efficient manner, thereby readily attaining high electronic conductivity and thermal conductivity. In addition, the carbon fiber can be dispersed in the active substance so as to enclose particles of the active substance, thereby enhancing the strength of the resultant electrode and establishing favorable contact between particles.

(1-5) Impurities in Carbon Fiber

Since carbon fiber is incorporated into a positive electrode, presence of a metal that is eluted at a positive electrode potential is not preferred. Thus, the carbon fiber preferably has a total impurity (Fe, Cu, etc.) content of 100 ppm or less, more preferably 30 ppm or less.

(1-6) Amount of Carbon Fiber Incorporated into Positive Electrode

The positive electrode has a carbon fiber content of 0.1 to 2 mass %, preferably 0.5 to 1.5 mass %. When the carbon fiber content is in excess of 2 mass %, the relative amount of the electrode active substance in the positive electrode decreases, resulting in decrease of electric capacity, whereas when the carbon fiber content is less than 0.1 mass %, conductivity of the positive electrode is insufficient, thereby inhibiting insertion or release of lithium ion. The carbon fiber content may be adjusted so as to fall within the above range through controlling the amount of carbon fiber added during production of the positive electrode.

(1-7) Surface Treatment of Carbon Fiber

The carbon fiber employed in the present invention may be surface-treated so as to control the dispersion state in the electrode. No particular limitation is imposed on the surface treatment method, and examples of the method include hydrophilization through oxidation for introduction of an oxygen-containing functionality, and hydrophobic treatment based on fluoridation or silicon treatment. Alternatively, coating with phenolic resin or similar resin, or mechanochemical treatment may be employed. When the carbon fiber is subjected to excessive surface treatment, conductivity and strength of the carbon fiber are considerably impaired. Thus, surface treatment must be performed to an appropriate degree.

The oxidation may be performed through, for example, heating carbon fiber in air at 500° C. for about one hour. Thus, hydrophilicity of the carbon fiber is enhanced through the oxidation.

2. Lithium Battery Positive Electrode and Active Substance Material Employed in the Electrode Examples of the active substance material that can occlude and release lithium ion and that is employed in the positive electrode of the present invention will next be described.

Heretofore, use, as a positive electrode active substance material of a lithium ion battery, of cobalt-containing oxides such as lithium cobaltate; manganese-containing oxides such as lithium manganate; nickel-containing oxides such as lithium niccolate; vanadium-containing oxides such as vanadium pentoxide; complex oxides thereof; mixtures thereof; and similar substances has been studied, and some of these materials have been actually employed. Such a positive electrode employing any of these materials has been investigated for increasing battery capacity through increasing electrode density.

Specifically, lithium cobaltate has a true density of about 5.1 g/cm$^3$, and an existing electrode employing lithium cobaltate has an electrode density less than 3.3 g/cm$^3$. Through incorporation of carbon fiber to the electrode, drop in electrolyte permeability can be prevented even when the electrode density is 3.7 g/cm$^3$. Lithium manganate has a true density of about 4.2 g/cm$^3$, and an existing electrode employing lithium magnanate has an electrode density less than 2.9 g/cm$^3$. Through incorporation of carbon fiber to the electrode, drop in electrolyte permeability can be prevented even when the electrode density is 3.2 g/cm$^3$. Lithium niccolate has a true density of about 5.0 g/cm$^3$, and an existing electrode employing lithium niccolate has an electrode density 3.2 g/cm$^3$ or less. Through incorporation of carbon fiber to the electrode, drop in electrolyte permeability can be prevented even when the electrode density is 3.5 g/cm$^3$. Vanadium pentoxide has a true density of about 2.9 g/cm$^3$, and an existing electrode employing vanadium pentoxide has an electrode density 2.0 g/cm$^3$ or less. Through incorporation of carbon fiber to the electrode, drop in electrolyte permeability can be prevented even when the electrode density is 2.3 g/cm$^3$.

In the case of a mixture of a cobalt-containing oxide (e.g., lithium cobaltate) and a manganese-containing oxide (e.g., lithium manganate), an existing electrode employing the mixture has an electrode density 3.1 g/cm$^3$ or less. Through incorporation of carbon fiber to the electrode, drop in electrolyte permeability can be prevented even when the electrode density is 3.5 g/cm$^3$.

The lithium-containing transition metal oxide serving as the positive electrode active substance material of the present invention is preferably an oxide predominantly containing lithium and at least one transition metal selected from among Ti, V, Cr, Mn, Fe, Co, Ni, Mo, and W, in which the ratio by mole between lithium and the transition metal is 0.3 to 2.2. More preferably, the positive electrode active substance material is an oxide predominantly containing lithium and at least one transition metal selected from among V, Cr, Mn, Fe, Co, and Ni, in which the ratio by mole between lithium and the transition metal is 0.3 to 2.2. The positive electrode active substance material may contain Al, Ga, In, Ge, Sn, Pb, Sb, Bi, Si, P, B, etc. in an amount of less than 30 mol % on the basis of the entirety of the transition metal serving as a primary component. Among the aforementioned positive electrode active substances, a preferred substance is at least one species selected from among materials being represented by the formula $Li_xMO_2$ (wherein M represents at least one element selected from among Co, Ni, Fe, and Mn, and x is 0 to 1.2); or at least one species selected from among materials having a spinel structure and being represented by the formula $Li_yN_2O_4$ (wherein N includes at least Mn, and y is 0 to 2).

Particularly preferably, the positive electrode active substance is at least one species selected from among materials containing $Li_yM_aD_{1-a}O_2$ (wherein M represents at least one element selected from among Co, Ni, Fe, and Mn; D represents at least one element selected from among Co, Ni, Fe, Mn, Al, Zn, Cu, Mo, Ag, W, Ga, In, Sn, Pb, Sb, Sr, B, and P, with the proviso that the element corresponding to M being excluded; y is 0 to 1.2; and a is 0.5 to 1); or at least one species selected from among materials having a spinel structure and being represented by the formula $Li_z(N_bE_{1-b})_2O_4$ (wherein N represents Mn; E represents at least one element selected from among Co, Ni, Fe, Mn, Al, Zn, Cu, Mo, Ag, W, Ga, In, Sn, Pb, Sb, Sr, B, and P; b is 1 to 0.2; and z is 0 to 2).

Specific examples of the positive electrode active substance include $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, and $Li_xMn_cFe_{2-c}O_4$ (wherein x is 0.02 to 1.2, a is 0.1 to 0.9, b is 0.8 to 0.98, c is 1.6 to 1.96, and z is 2.01 to 2.3). Examples of most preferred lithium-containing transition metal oxides include $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$ (wherein x is 0.02 to 1.2, a is 0.1 to 0.9, b is 0.9 to 0.98, and z is 2.01 to 2.3). The value x is a value as measured before initiation of charge/discharge, and is increased or decreased through charge/discharge.

Other materials such as metal sulfides (e.g., titanium sulfide and molybdenum sulfide), which are next-generation materials for a lithium battery positive electrode, have been extensively studied to produce a high-density electrode. According to the present invention, through incorporation of carbon fiber to the electrode, drop in electrolyte permeability can be prevented even when the electrode density is 2.0 g/cm$^3$.

Iron olivine compounds such as $LiFePO_4$ have high theoretical capacity and are excellent in source availability, environmental safety, heat resistance, etc., by virtue of iron contained in the compounds. Thus, the compounds have been extensively studied as next-generation materials for a lithium battery positive electrode. $LiFePO_4$ has a true density of 3.6 g/cm$^3$, which is lower than that of a positive electrode material (e.g., lithium cobaltate) currently employed in a lithium ion battery. Therefore, there is keen demand for a high-density electrode employing $LiFePO_4$. According to the present invention, through incorporation of carbon fiber to the electrode, drop in electrolyte permeability can be prevented even when the electrode density is 2.9 g/cm$^3$. Since iron olivine compounds have relatively low conductivity, combination thereof with carbon-fiber-based conductive material is essential for effective production of a complex electrode material.

No particular limitation is imposed on the mean primary particle size of particles of the positive electrode active substance. Generally, the mean particle size is preferably 0.1 to 50 μm. Preferably, the volume of particles having a particle size of 0.5 to 30 μm is 95% or more on the basis of the entire volume of the positive electrode active substance particles. More preferably, the volume of particles having a particle size of 3 μm or less is 18% or less on the basis of the entire volume of the positive electrode active substance particles, and the volume of particles having a particle size of 25 to 30 μm is 18% or less on the basis of the entire volume of the positive electrode active substance particles. No particular limitation is imposed on the specific surface area of the positive electrode active substance, but the specific surface area as measured particularly preferably 0.2 to 10 m$^2$/g.

3. Fabrication of Electrode

No particular limitation is imposed on the method of producing the lithium battery positive electrode of the present invention. Generally, the aforementioned positive electrode active substance material, carbon fiber, and binder material are mixed, and the mixture is applied to a carrier substrate such as a metal collector, followed by drying and press-forming, whereby a positive electrode can be fabricated.

Examples of the mixing method include (1) mixing a positive electrode active substance material (optionally including a conductive enhancer such as carbon black, hereinafter the same is applied), a carbon fiber, and a binder material; (2) mixing a positive electrode active substance material and a carbon fiber, followed by mixing of the mixture with a binder material; (3) mixing a positive electrode active substance material and a binder material, followed by mixing of the mixture with a carbon fiber; and (4) mixing a carbon fiber and a binder material, followed by mixing of the mixture with a positive electrode active substance material.

The dispersion state of raw materials in the electrode varies depending on the type, compositional proportions, combinations, etc. of the raw materials, and properties such as electrode resistance and liquid absorbability vary depending on the dispersion state. Thus, an appropriate mixing method must be selected so as to satisfy the conditions.

No particular limitation is imposed on the method of mixing the positive electrode active substance material and the carbon fiber. For example, these materials may be stirred by use of a mixer or a similar apparatus. No particular limitation is imposed on the stirring method. For example, stirring may be carried out by use of an apparatus such as a ribbon mixer, a screw kneader, a Spartan ryuzer, a Lodige mixer, a planetary mixer, or a general-purpose mixer.

No particular limitation is imposed on the mixing the binder with the positive electrode active substance, carbon fiber, or a mixture thereof. Examples include a method including dry mixing and subsequent kneading by use of a solvent; a method including diluting a binder material with a solvent and kneading the diluted binder material with an electrode active substance and a carbon fiber, or a mixture thereof (negative electrode material mixture). The resultant mixture containing a solvent is applied to a collector (substrate), to thereby form a sheet of the mixture. In order to adjust the viscosity of the resultant mixture containing a solvent, a thickener such as a polymer (e.g., CMC (sodium carboxymethyl cellulose) or polyethylene glycol) may be added to the mixture.

Any known binders may be used in the present invention. Examples include fluorine-containing polymers (e.g., polyvinylidene fluoride and polytetrafluoroethylene), and rubbers. (e.g., SBR (styrene-butadiene rubber)). Any known solvent suitable for the corresponding binders may be employed. When a fluorine-containing polymer is employed as a binder, for example, toluene, N-methylpyrrolidone, or acetone may be employed as a solvent. When SBR is employed as a binder, for example, water may be employed as a solvent.

The amount of binder is preferably 0.5 to 20 parts by mass, on the basis of 100 parts by mass of a positive electrode active substance material, particularly preferably about 1 to about 15 parts by mass.

No particular limitation is imposed on the method of kneading after addition of solvent. For example, kneading may be carried out by use of a known apparatus such as a ribbon mixer, a screw kneader, a Spartan ryuzer, a Lodige mixer, a planetary mixer, or a general-purpose mixer.

The thus-kneaded mixture is applied to a collector, to thereby fabricate a positive electrode sheet employed in the present invention.

Application of the kneaded mixture to a collector may be carried out through a known method. For example, the mixture is applied to the collector by use of a doctor blade, a bar coater, or a similar apparatus, and then the coated collector is subjected to molding through, for example, roll pressing.

The collector may be formed of a known material such as aluminum, stainless steel, nickel, titanium, an alloy thereof, platinum, or carbon sheet.

The thus-coated electrode sheet is dried through a conventional method, and subsequently molded through a known method such as roll pressing or press forming in such a manner that the volume fraction of the positive electrode active substance of the positive electrode is adjusted to 80% or higher, thereby attaining a thickness and a density of interest.

The pressure for molding may be determined so as to fall within a range, so long as the volume fraction of the positive electrode active substance of the positive electrode is adjusted to 70% or higher. Although the pressure varies depending upon the type of positive electrode active substance material employed, the pressure is generally 1 ton/cm$^2$ or more. The thickness of the electrode sheet varies in accordance with the shape of the battery of interest and is not particularly limited. The electrode sheet is generally molded to a thickness of 0.5 to 1,000 μm, preferably 5 to 500 μm.

4. Fabrication of Battery

The battery of the present invention employs the positive electrode of the present invention containing carbon fiber, and may be produced through a known method. Particularly, a high-density electrode containing the carbon fiber is preferably employed as a positive electrode of a high-energy-density, non-aqueous secondary battery such as a lithium ion battery or a lithium polymer battery. A typical method for producing a lithium ion battery and/or a lithium polymer battery will next be described.

The thus-fabricated positive electrode sheet is formed into a desired shape, and combined with a graphite negative electrode sheet and a lithium metal negative electrode sheet. Specifically, these sheets are stacked to form a structure of positive electrode sheet/separator/negative electrode sheet, so as to avoid contact between the positive electrode and the negative electrode. The stacked structure is placed in a casing of a shape such as coin, square, cylinder, or sheet. In case the stacked structure possibly absorbs water or oxygen during stacking or placing into the casing, the structure is dried again under reduced pressure and/or in an inert atmosphere of low dew point (−50° C. or lower) and then transferred to a low-dew-point inert atmosphere. Subsequently, an electrolyte is injected to the casing, followed by sealing of the casing, whereby a lithium ion battery or a lithium polymer battery is fabricated.

Any known separator may be employed, but polyethylene- or polypropylene-made microporous film is preferred from the viewpoint of small thickness and high strength. The porosity is preferably higher from the viewpoint of ion conductivity. However, an excessive porosity causes decrease in strength and short circuit between the positive electrode and the negative electrode. Thus, the porosity of the employed separator is generally 30 to 90%, preferably 50 to 80%. The separator is preferably thin from the viewpoint of ion conductivity and battery capacity. However, an excessively small thickness causes decrease in strength and short circuit between the positive electrode and the negative electrode. Thus, the thickness of the employed separator is generally 5 to 100 μm, preferably 5 to 50 μm. The microporous films may be used in combination of two or more species or in combination with another separator such as non-woven fabric.

In a non-aqueous secondary battery, particularly in a lithium ion battery and/or a lithium polymer battery, the electrolytic solution may be any known organic electrolytic solution, and the electrolyte may be any known inorganic solid electrolyte or polymer solid electrolyte.

Examples of preferred organic solvents employable for preparing the organic electrolytic solution include ethers such as diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether, and ethylene glycol phenyl ether; amides such as formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide, and hexamethylphosphoryl amide; sulfur-containing compounds such as dimethyl sulfoxide and sulfolane; dialkyl ketones such as methyl ethyl ketone and methyl isobutyl ketone; cyclic ethers such as ethylene oxide, propylene oxide, tetrahydrofuran, 2-methoxytetrahydrofuran, 1,2-dimethoxyethane, and 1,3-dioxolan; carbonates such as ethylene carbonate and propylene carbonate; γ-butyrolactone; N-methylpyrrolidone; acetonitrile; and nitromethane. More preferred examples include esters such as ethylene carbonate, butylene carbonate, diethyl carbonate, dimethyl carbonate, methyl ethyl carbonate, propylene carbonate, vinylene carbonate, and γ-butyrolactone; ethers such as dioxolan, diethyl ether, and diethoxyethane; dimethyl sulfoxide; acetonitrile; and tetrahydrofuran. Particularly, carbonate-based non-aqueous solvents such as ethylene carbonate and propylene carbonate are preferably employed. These solvents may be employed singly or in combination of two or more species.

A lithium salt is employed as a solute (electrolyte) which is to be dissolved in the aforementioned solvent. Examples of generally known lithium salts include $LiClO_4$, $LiBF_4$, $LiPF_6$, $LiAlCl_4$, $LiSbF_6$, LiSCN, LiCl, $LiCF_3SO_3$, $LiCF_3CO_2$, and $LiN(CF_3SO_2)_2$.

Examples of the polymer solid electrolyte include polyethylene oxide derivatives and polymers containing the derivatives, polypropylene oxide derivatives and polymers containing the derivatives, phosphoric acid ester polymers, and polycarbonate derivatives and polymers containing the derivatives.

No particular limitation is imposed on the selection of essential battery members other than the aforementioned members.

BEST MODE FOR CARRYING OUT THE INVENTION

The present invention will next be described in detail by way of some examples. Needless to say these examples are give for the illustration purpose only, and should not be construed as limiting the invention thereto.

1. Mean Particle Size:

Determined by use of a laser diffraction scattering particle size distribution measuring apparatus (Microtrac HRA, product of NIKKISO Co., Ltd.).

2. Specific Surface Area:

Determined by use of a specific surface area measuring apparatus (NOVA-1200, product of Yuasa Ionics Inc.) through the BET method, which is a conventional method for measuring specific surface area.

3. Battery Evaluation Method:

(1) Fabrication of a Positive Electrode Containing Carbon Fiber

A positive electrode active substance, acetylene black (hereinafter may be abbreviated as AB, product of Denki Kagaku Kogyo K. K.), and a carbon fiber were mixed twice in predetermined proportions by use of a high-speed small mixer (dry format) equipped with a paddle (IK mixer) at 10,000 rpm for 30 seconds, to thereby prepare a positive electrode material mixture. To the mixture, KF Polymer L#1320 (a solution containing 12 mass % polyvinylidene fluoride (hereinafter may be abbreviated as PVDF) in N-methylpyrrolidone (hereinafter may be abbreviated as NMP), product of Kureha Chemical Industry Co., Ltd.) was added such that the ratio by mass of positive electrode material mixture to PVDF is adjusted to 97:3, and the resultant mixture was kneaded by use of a planetary mixer, to thereby prepare a positive electrode paste.

Subsequently, viscosity of the above positive electrode paste was adjusted through addition of NMP thereto, and the paste was applied, by use of a doctor blade, to rolled aluminum foil (thickness 25 μm, product of Showa Denko K. K.) serving as a positive electrode collector to a predetermined thickness. The coated foil was dried at 120° C. in vacuum for one hour, and the dried foil was punched out to thereby provide 18-mmΦ electrode pieces. Each electrode piece was sandwiched by press sheets made of ultrahigh strength steel and pressed at a pressure of about $1\times10^2$ to $3\times10^2$ N/mm$^2$ ($1\times10^3$ to $3\times10^3$ kg/cm$^2$) with respect to the electrode piece, to thereby prepare an electrode piece having a thickness of about 100 μm and a predetermined electrode density. The electrode piece was dried at 120° C. for 12 hours in a vacuum drier, to thereby provide an electrode piece for evaluation.

(2) Fabrication of Meso-Carbon-Microbeads (Hereinafter May be Abbreviated as MCMB) Graphite Negative Electrode A negative electrode which is employed in combination with the carbon-fiber-containing positive electrode fabricated in (1) above was produced through the following procedure. A meso-carbon-microbeads graphite (product of Osaka Gas Co., Ltd., mean particle size: 17 μm, and specific surface area: 1.8 m$^2$/g) and acetylene black (AB) (product of Denki Kagaku Kogyo K. K.) were mixed twice at a ratio of mass of 95:5 by use of a high-speed small mixer (dry format) equipped with a paddle (IK mixer) at 10,000 rpm for 30 seconds, to thereby prepare a negative electrode material mixture. To the mixture, KF Polymer L#9210 (a solution containing 10 mass % polyvinylidene fluoride (PVDF) in N-methylpyrrolidone (NMP), product of Kureha Chemical Industry Co., Ltd.) was added such that the ratio by mass of negative electrode material mixture to PVDF is adjusted to 95:5, and the resultant mixture was kneaded by use of a planetary mixer, to thereby prepare a negative electrode paste.

Subsequently, viscosity of the above negative paste was adjusted through addition of NMP thereto, and the paste was applied, by use of a doctor blade, to rolled copper foil (thickness 20 μm, product of Nippon Foil Mfg. Co., Ltd.) to a predetermined thickness. The coated foil was dried at 120° C. in vacuum for one hour, and the dried foil was punched out to thereby provide 18-mmΦ electrode pieces. Each electrode piece was sandwiched by press sheets made of ultrahigh strength steel and pressed at a pressure of about $1\times10^2$ to $3\times10^2$ N/mm$^2$ ($1\times10^3$ to $3\times10^3$ kg/cm$^2$) with respect to the electrode piece. The electrode piece was dried at 120° C. for 12 hours in a vacuum drier, to thereby provide an electrode piece for evaluation. The electrode piece was found to have a thickness of about 100 μm and an electrode density of about 1.5 g/cm$^3$.

(3) Evaluation of Electrolyte Permeation Time

Propylene carbonate (hereinafter may be abbreviated as PC) (3 μL), which has a viscosity at 25° C. approximately equivalent to that of a generally employed electrolyte and has low volatility, was added dropwise at 25° C. to the surface of each positive electrode (18 mmΦ) fabricated in (1) above by use of a microsyringe, and the period of time required for permeation of PC into the electrode was measured for three times. The averaged value was evaluated.

(4) Fabrication of a Test Cell for a Lithium Ion Battery

A three-electrode cell was produced as follows. The below-described procedure was carried out in an atmosphere of dried argon having a dew point of −80° C. or lower.

In a polypropylene-made cell (inner diameter: about 18 mmΦ) having a screw cap, the aluminum-foil positive electrode fabricated in (2) above and the copper-foil negative electrode fabricated in (3) above were stacked by the mediation of a separator (polypropylene-made microporous film (Celgard 2400), 25 μm). Subsequently, a metallic lithium foil (50 μm) serving as a reference electrode was stacked in a similar manner. Thereafter, an electrolyte was added to the cell, and the resultant cell was employed for testing.

(5) Electrolytic Solution

The electrolytic solution was prepared by dissolving LiPF$_6$ (1.2 mol/L), serving as an electrolyte, in a mixture of ethylene carbonate (hereinafter may be abbreviated as EC) (8 parts by mass) and methyl ethyl carbonate (hereinafter may be abbreviated as MEC) (12 parts by mass).

(6) Charge/Discharge Cycle Test

Constant-current constant-voltage charge/discharge test was performed at a current density of 0.6 mA/cm$^2$ (corresponding to 0.3° C.).

Constant-current (CC) charging was performed at 0.6 MA/cm$^2$ while voltage was increased from rest potential to 4.2 V. Subsequently, constant-voltage (CV) charging was performed at 4.2 V, and charging was stopped when the current value decreased to 25.4 μA.

CC discharging was performed at 0.6 mA/cm$^2$ (corresponding to 0.3 C), and was cut off when a voltage of 2.7 V was attained.

4. Percent Volume (%) of Positive Electrode Active Substance in Positive Electrode The percent volume was calculated on the basis of the following relationship.

> Percent volume (%) of positive electrode active substance in positive electrode=100×{(mass of positive electrode active substance in electrode)×(true density of positive electrode active substance)/(volume of electrode)}

The electrode volume was calculated from the dimensions of the electrode. The mass of positive electrode active substance in the electrode was calculated by deriving percent by mass (%) of positive electrode active substance from the proportions of positive electrode substance, carbon material, and binder material and by multiplying mass of electrode.

EXAMPLE 1

Evaluation of Electrolyte Permeability of Electrodes

Through the method described in 3(1) to (2) above, 12 types of $LiCoO_2$ electrodes and 6 types of $Li_2Mn_2O_4$ shown in Table 1 were fabricated by use of the positive electrode active substance materials and carbon fibers listed below. PC permeation time was determined in accordance with the method described in 3(3) above. Compositions, densities, and determined times of the electrodes are shown in Table 1.

<Positive Electrode Active Substance Materials>
$LiCoO_2$: product of The Nippon Chemical Industrial Co., Ltd., mean particle size: 20 μm
$Li_2Mn_2O_4$: product of Mitsui Mining & Smelting Co., Ltd., mean particle size: 17 μm
<Carbon Fibers>
CF: Vapor Grown Graphite Fiber
  Mean fiber length (based on SEM image analysis); 150 nm
  Mean fiber length (based on SEM image analysis): 8 μm.
  Mean aspect ratio: 53
  Branching degree (Number of branching points per 1 μm fiber, calculated through SEM image analysis; the manner being applied to the following): about 0.1 points/μm
  X-ray $C_0$: 0.6767 nm, Lc: 48.0 nm
CF-S: Vapor Grown Graphite Fiber
  Mean fiber length (based on SEM image analysis): 120 nm
  Mean fiber length (based on SEM image analysis): 12 μm
  Mean aspect ratio: 100
  Branching degree: about 0.02 points/μm
  X-ray $C_0$: 0.6767 nm, Lc: 48.0 nm
NF: Vapor Grown Graphite Nano-Fiber
  Mean fiber length (based on SEM image analysis): 80 nm
  Mean fiber length (based on SEM image analysis): 6 μm
  Mean aspect ratio: 75
  Branching degree: about 0.1 points/μm
  X-ray $C_0$: 0.6801 nm, Lc: 35.0 nm
NT: Vapor Grown Graphite Nano-Tube
  Mean fiber length (based on SEM image analysis): 25 μm
  Mean fiber length (based on SEM image analysis): 5 μm
  Mean aspect ratio: 200
  Branching degree: 0.1 points/μm
  X-ray $C_0$: 0.6898 nm, Lc: 30.0 nm

TABLE 1

Electrolyte permeation times of carbon-fiber-containing electrodes

| Electrode material | Active substance material | Carbon fiber | Proportions by mass (active substance/carbon fiber/AB/PVDF) | Electrode density (g/cm$^3$) | Volume of active substance (%) | Permeation time (s) |
|---|---|---|---|---|---|---|
| $LiCoO_2$ positive electrode | | | | | | |
| CoAB-1 | $LiCoO_2$ | None | 90/0/5/5 | 3.8 | 65.3 | 2,030 |
| CoVC-1 | | CF | 90/2/3/5 | | 65.3 | 1,100 |
| CoAB-2 | | None | 94/0/3/3 | | 68.2 | 1,630 |
| CoVC-2 | | CF | 94/1/2/3 | | 68.2 | 800 |
| CoAB-3 | | None | 95/0/2/3 | | 70.7 | 1,400 |
| CoVC-3 | | CF | 95/1/1/3 | | 70.7 | 250 |
| CoVS-2 | | CF-S | 95/1/1/3 | | 70.7 | 300 |
| CoVN-2 | | NF | 95/1/1/3 | | 70.7 | 320 |
| CoVT-2 | | NT | 95/1/1/3 | | 70.7 | 350 |
| CoAB-4 | | None | 97/0/1/2 | 3.9 | 74.2 | 800 |
| CoVS-3 | | CF-S | 97/1/0/2 | | 74.2 | 200 |
| CoVN-3 | | NF | 97/1/0/2 | | 74.2 | 250 |
| $LiMn_2O_4$ positive electrode | | | | | | |
| MnAB-1 | $LiMn_2O_4$ | None | 95/0/2/3 | 3.2 | 72.4 | 1,600 |
| MnVC-1 | | CF | 95/1/1/3 | | 72.4 | 250 |
| MnVS-1 | | CF-S | 95/1/1/3 | | 72.4 | 280 |
| MnVN-1 | | NF | 95/1/1/3 | | 72.4 | 300 |
| MnAB-2 | | None | 97/0/1/2 | 3.3 | 76.2 | 900 |
| MnVS-2 | | CF | 97/1/0/2 | | 76.2 | 200 |

As is clear from Table 1, addition of carbon fiber remarkably shortened electrolyte permeation times of the electrode materials, as compared with the cases in which no carbon fiber was added. Specifically, permeation times of $LiCoO_2$ positive electrodes were shortened to 20 to 31%, on the basis the permeation time of carbon-fiber-non-added electrode as a reference. Similarly, in the case where $LiMn_2O_4$ was used, permeation time was shortened through addition of carbon fiber.

EXAMPLE 2

Charge/Discharge Cycle Characteristics of Test Cells for Lithium Ion Batteries

The positive electrode-negative electrode combinations prepared in a manner similar to that of Example 1 were evaluated in terms of cycle characteristics in accordance with the aforementioned battery evaluation method. Table 2 shows the results.

TABLE 2

Charge/discharging cycle characteristics of Li ion battery test cells employing various positive electrodes (average of two measurements)

| Positive electrode (density: g/cm³) | Carbon fiber (amount in positive electrode) | Proportions by mass (active substance/ carbon fiber/AB/ PVDF) | Capacity by volume density*¹ (A·h/L) | Cycle characteristics*² |
|---|---|---|---|---|
| CoAB-1 (3.8) | None | 90/0/5/5 | 463.2 | 70 |
| CoAB-2 (3.8) | None | 94/0/3/3 | 504.1 | 250 |
| CoAB-3 (3.8) | None | 95/0/2/3 | 505.4 | 115 |
| CoAB-4 (3.9) | None | 97/0/1/2 | 454.0 | 33 |
| CoVC-1 (3.8) | CF (2%) | 90/2/3/5 | 490.0 | 180 |
| CoVC-2 (3.8) | CF (1%) | 94/1/2/3 | 511.7 | 163 |
| CoVC-3 (3.8) | CF (1%) | 95/1/1/3 | 534.3 | 383 |
| CoVS-2 (3.8) | CF-S (1%) | 95/1/1/3 | 541.5 | 480 |
| CoVS-3 (3.9) | CF-S (1%) | 97/1/0/2 | 541.0 | 418 |
| CoVN-2 (3.8) | NF (1%) | 95/1/1/3 | 534.3 | 423 |
| CoVT-2 (3.8) | NT (1%) | 95/1/1/3 | 534.3 | 430 |
| CoVN-3 (3.9) | NF (1%) | 97/1/0/2 | 529.6 | 335 |
| MnAB-1 (3.2) | None | 95/0/2/3 | 334.4 | 210 |
| MnAB-2 (3.3) | None | 97/0/1/2 | 288.1 | 121 |
| MnVC-1 (3.2) | CF (1%) | 95/1/1/3 | 358.7 | 451 |
| MnVS-1 (3.2) | CF-S (1%) | 95/1/1/3 | 364.8 | 515 |
| MnVN-1 (3.2) | NF (1%) | 95/1/1/3 | 358.7 | 481 |
| MnVS-2 (3.3) | CF-S (1%) | 97/1/0/2 | 368.1 | 438 |

*¹Battery discharge capacity/positive electrode volume
*²Cycle number 80% or more the maximum capacity As is clear from Table 2, cycle characteristics of positive electrodes containing no carbon fiber were considerably impaired when electrode density was elevated. In contrast, in the case of positive electrodes containing carbon fiber, capacity per volume (capacity by volume density) was enhanced and cycle characteristics were not considerably impaired, when electrode density was elevated.

INDUSTRIAL APPLICABILITY

According to the present invention, the density of the lithium battery positive electrode can be elevated through increasing the amount of a positive electrode active substance incorporated into the electrode. Therefore, a lithium battery of high energy density; i.e., a battery having a large capacity per battery volume, can be produced.

When the positive electrode density is elevated through high-density packing of an electrode material, interspaces in the positive electrode decrease. Therefore, the amount of an electrolyte, which is present in the interspaces and plays an important role in electrode reaction, decreases, and permeation of the electrolyte into the electrode requires a longer time, which are problematic. As a result, electrode reaction is retarded, thereby problematically lowering energy density or high-speed charge/discharge performance, and the time for producing batteries is prolonged, thereby increasing production cost and other costs. The lithium battery positive electrode of the present invention contains carbon fiber. Therefore, even when the electrode has high density, decrease in electrolyte permeability is prevented, and electrolyte retention is improved, thereby solving the aforementioned problems.

The invention claimed is:

1. A lithium battery positive electrode comprising an active substance that can occlude and release lithium ion, a carbon-based conductivity enhancer comprising a carbon fiber, and a binder, wherein the positive electrode contains the carbon fiber in an amount of 0.1 to 2 mass % on the basis of the entire mass of the positive electrode, the carbon fiber has a mean fiber diameter of 10 to 200 nm, and the positive electrode contains the active substance that can occlude and release lithium ion in an amount, as calculated from the true density of the active substance, of 72.4% by volume or more on the basis of the total volume of the positive electrode.

2. The lithium battery positive electrode as claimed in claim 1, wherein the active substance is a metal oxide compound that can occlude and release lithium ion.

3. The lithium battery positive electrode as claimed in claim 1, wherein the carbon fiber is a graphite carbon fiber which has undergone heat treatment at 2,000° C. or higher.

4. The lithium battery positive electrode as claimed in claim 1, wherein the carbon fiber has a total metal impurity content of 30 ppm or less.

5. The lithium battery positive electrode as claimed in claim 1, wherein the carbon fiber is a graphite carbon fiber containing boron in an amount of 0.1 to 100,000 ppm.

6. The lithium battery positive electrode as claimed in claim 1, wherein the carbon fiber has a mean aspect ratio of 50 to 15,000.

7. The lithium battery positive electrode as claimed in claim 1, wherein the carbon fiber has a hollow inner structure.

8. The lithium battery positive electrode as claimed in claim 1, wherein the carbon fiber contains a branched carbon fiber.

9. The lithium battery positive electrode as claimed in claim 2, wherein the metal oxide compound serving as the active substance that can occlude and release lithium ion has a mean primary particle size of 0.5 to 30 μm.

10. The lithium battery positive electrode as claimed in claim 2, wherein the metal oxide compound serving as the active substance that can occlude and release lithium ion contains a cobalt-containing oxide in an amount of 60 mass % or more and the positive electrode has an electrode density of 3.7 g/cm³ or more.

11. The lithium battery positive electrode as claimed in claim 2, wherein the metal oxide compound serving as the active substance that can occlude and release lithium ion contains a manganese-containing oxide in an amount of 60 mass % or more and the positive electrode has an electrode density of 3.2 g/cm³ or more.

12. The lithium battery positive electrode as claimed in claim 2, wherein the metal oxide compound serving as the active substance that can occlude and release lithium ion contains a mixture of a cobalt-containing oxide and a manganese-containing oxide, in an amount of 80 mass % or more and the positive electrode has an electrode density of 3.5 g/cm³ or more.

13. The lithium battery positive electrode as claimed in claim 2, wherein the metal oxide compound serving as the active substance that can occlude and release lithium ion contains a nickel-containing oxide in an amount of 60 mass % or more and the positive electrode has an electrode density of 3.5 g/cm³ or more.

14. The lithium battery positive electrode as claimed in claim 2, wherein the metal oxide compound serving as the active substance that can occlude and release lithium ion contains a mixture of a cobalt nickel complex oxide in an amount of 60 mass % or more and the positive electrode has an electrode density of 3.6 g/cm³ or more.

15. The lithium battery positive electrode as claimed in claim 2, wherein the metal oxide compound serving as the active substance that can occlude and release lithium ion contains a mixture of a cobalt manganese complex oxide in an amount of 60 mass % or more and the positive electrode has an electrode density of 3.6 g/cm³ or more.

16. The lithium battery positive electrode as claimed in claim 2, wherein the metal oxide compound serving as the active substance that can occlude and release lithium ion contains a mixture of a cobalt nickel manganese complex oxide in an amount of 60 mass % or more and the positive electrode has an electrode density of 3.6 g/cm³ or more.

17. The lithium battery positive electrode as claimed in claim 2, wherein the metal oxide compound serving as the active substance that can occlude and release lithium ion contains an iron olivine compound having an olivine structure and the positive electrode has an electrode density of 2.9 g/cm³ or more.

18. A lithium battery comprising, as a constitutional element, a lithium battery positive electrode as recited in claim 1.

19. A lithium secondary battery comprising, as a constitutional element, a lithium battery positive electrode as recited in claim 1.

20. The lithium secondary battery as claimed in claim 19, wherein the battery employs a non-aqueous electrolyte and/or a non-aqueous polymer electrolyte, and the non-aqueous electrolyte and/or the non-aqueous polymer electrolyte employ(s) a non-aqueous solvent containing at least one species selected from the group consisting of ethylene carbonate, diethyl carbonate, dimethyl carbonate, methyl ethyl carbonate, propylene carbonate, butylene carbonate, and vinylene carbonate.

21. The lithium battery positive electrode as claimed in claim 1, characterized in that the carbon-based conductivity enhancer contains the carbon fiber in an amount of 50 mass % or more based on the mass of the carbon-based conductivity enhancer.

* * * * *